(12) United States Patent
Pelchen et al.

(10) Patent No.: US 6,945,896 B2
(45) Date of Patent: Sep. 20, 2005

(54) AUXILIARY TRANSMISSION WITH CONTROLLABLE CLUTCH

(75) Inventors: Christoph Pelchen, Tettnang (DE); Ünal Gazyakan, Friedrichshafen (DE); Barbara Schmohl, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/695,699

(22) Filed: Oct. 29, 2003

(65) Prior Publication Data
US 2004/0106491 A1 Jun. 3, 2004

(30) Foreign Application Priority Data
Nov. 28, 2002 (DE) .......................................... 102 55 393

(51) Int. Cl.[7] .............................................. F16H 57/04
(52) U.S. Cl. ...................................................... 475/159
(58) Field of Search ................................ 475/159, 320, 475/295, 149

(56) References Cited

U.S. PATENT DOCUMENTS

| | | | | | |
|---|---|---|---|---|---|
| 4,770,266 A | * | 9/1988 | Yamaguchi et al. | ........ | 180/248 |
| 4,840,246 A | * | 6/1989 | Yamakawa et al. | ......... | 180/247 |
| 5,066,268 A | * | 11/1991 | Kobayashi | ................... | 475/249 |
| 5,409,429 A | | 4/1995 | Showalter et al. | .......... | 475/295 |
| 5,704,867 A | * | 1/1998 | Bowen | ........................ | 475/221 |
| 5,924,952 A | * | 7/1999 | Bowen | ........................ | 475/313 |
| 6,533,692 B1 | * | 3/2003 | Bowen | ........................... | 475/5 |

* cited by examiner

Primary Examiner—Sherry Estremsky
(74) Attorney, Agent, or Firm—Davis & Bujold, P.L.L.C.

(57) ABSTRACT

An auxiliary transmission (31) with controllable clutch (2) is described for the optional distribution of a drive output torque to one or more drive output shafts with a reduction gear stage (3) and with a hydraulic pump (14). The hydraulic pump (14) is arranged on a transmission input shaft (4) and the reduction gear stage (3) is connected in series in such manner that the drive input power to the hydraulic pump (14) remains at least approximately the same when a range change takes place in the reduction gear stage (3).

10 Claims, 2 Drawing Sheets

US 6,945,896 B2

AUXILIARY TRANSMISSION WITH CONTROLLABLE CLUTCH

This application claims priority from German Application Serial No. 102 55 393.9 filled Nov. 28, 2002.

FIELD OF THE INVENTION

The invention concerns an auxiliary transmission with controllable clutch,

BACKGROUND OF THE INVENTION

From U.S. Pat. No. 5,409,429 an auxiliary transmission is known, by virtue of which all-wheel drive can be engaged in case of need. For this, the auxiliary transmission has a controllable clutch and a distributor unit for the optional distribution of the drive torque to one or two drive output shafts of a vehicle. In addition, the auxiliary transmission is made with a reduction gear stage and a hydraulic pump.

However, a drawback of this is that the hydraulic pump is located after the reduction gear stage and the delivery performance of the pump varies markedly as a function of the engagement condition of the reduction gear stage, so that in order to guarantee the supply to the auxiliary transmission the hydraulic pump has to be made very large.

The purpose of the present invention is therefore to provide an auxiliary transmission of low total weight that can be adapted to various requirement profiles in a simple way and in which the drive power available for a hydraulic pump is at least approximately constant.

SUMMARY OF THE INVENTION

In that the hydraulic pump is arranged on a transmission input shaft and the reduction gear stage is in series with it in such manner that the drive power of the hydraulic pump remains at least approximately the same when a range change takes place in the reduction gear stage, it is ensured that regardless of the engagement condition of the reduction gear stage the hydraulic pump will always be driven with the same drive power at the same transmission input speed, so that oversizing of the hydraulic pump can be avoided.

Compared with the auxiliary transmissions known from the prior art, an auxiliary transmission designed in this way has the advantage that it can be made smaller and is therefore also characterized by lower overall weight.

In an advantageous embodiment of the auxiliary transmission according to the invention, it is provided that the hydraulic pump is arranged outside a mounting of a transmission input shaft, such that the individual transmission bearings of the transmission mounting have a shorter distance between them and bend loading of the transmission input shaft is advantageously minimized.

In another advantageous further development of the auxiliary transmission according to the invention, it is provided that the reduction gear stage is positioned after the controllable clutch and the distributor unit. In a simple way this provides an auxiliary transmission of modular structure, making it possible to construct the auxiliary transmission so that it has various functions, with only slight design modifications.

In a further development of the object of the invention, it is provided that the controllable clutch and the reduction gear stage are actuated by an electric motor, which is preferably arranged on a main transmission unit in a coupling zone of the auxiliary transmission according to the invention, with which the auxiliary transmission forms a range-change transmission. This arrangement of the electric motor close to a main transmission unit advantageously reduces vibration loading on the electric motor made as a control motor, compared with the auxiliary transmissions known from current practice, so imparting longer life to the control drive.

BRIEF DESCRIPTION OF THE DRAWINGS

The invention will now be described, by way of example, with reference to the accompanying drawings which.

DETAILED DESCRIPTION OF THE INVENTION

Figure 1:
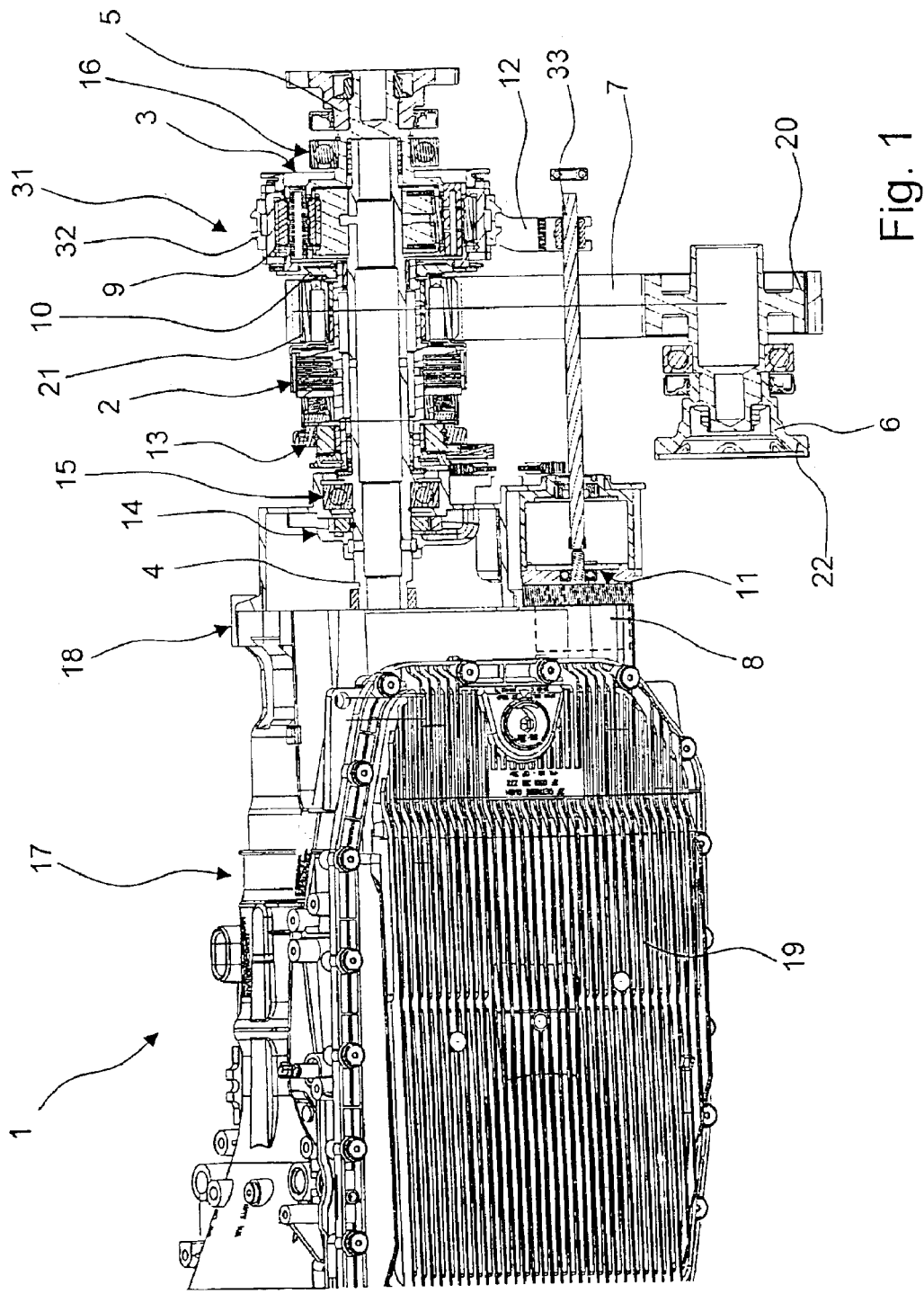
FIG. 1 is a first example embodiment of a range-change transmission consisting of a main transmission unit and an auxiliary transmission according to the invention.

With reference to FIG. 1, a range-change transmission 1 is shown, which comprises a main transmission unit 17 and a longitudinal auxiliary transmission or auxiliary (transfer) transmission 31 with a controllable clutch 2, for a vehicle not shown in any detail. The auxiliary transmission 31 is made with a planetary gear wheel assembly 3 as the transmission stage or reduction stage for an off-road gear that can be engaged while driving.

A drive torque delivered by a drive motor (not shown) is led into the auxiliary transmission 31 via a drive input shaft 4 and transferred via a first drive output shaft 5 and a second drive output shaft 6 to two drive shafts (not shown) of the vehicle, the second drive output shaft 6 being driven by the drive input shaft 4 via a chain 7. The connection between the drive input shaft 4 and the second drive output shaft 6 can be controlled by virtue of the clutch 2 formed as a disk clutch in such manner that the connection is formed when the clutch 2 is engaged or closed, and interrupted when the clutch 2 is open. The all-wheel drive is therefore engaged or disengaged by means of the clutch which, in combination with the chain 7, constitutes a so-termed distributor unit for the optional distribution of a drive output torque to the first drive output shaft 5 or to both drive output shafts 5, 6 of the auxiliary transmission 31.

Actuation of the clutch 2, i.e., engagement and disengagement of the clutch takes place via an electric motor 8. The actuation of the clutch 2 depends on the respective rotation direction of the electric motor 8, in the sense of whether the clutch 2 is opened or closed. Moreover, the planetary gear wheel assembly 3 is also actuated by the electric motor 8. For this, the electric motor 8 is in active connection with the planetary gear wheel assembly 3 via a shaft 33, a rocker arm 12 and a sliding bush 32.

The shaft 33 is displaced by a spherical-thread drive In the axial direction of the auxiliary transmission 31, whereby the sliding bush 32 can be moved between two engagement positions. In a first engagement position of the sliding bush 32 an annular gear wheel 9 of the planetary gear wheel assembly 3 is connected to a web 10 of the planetary gear wheel assembly. In the second engagement position of the sliding bush 32, the annular gear wheel 9 is connected fast to a transmission housing of the auxiliary transmission 31 not shown in detail. The off-road gear of the auxiliary transmission 31 is engaged when the annular gear wheel 9 is connected fast to the transmission housing of the auxiliary transmission 31 by virtue of claw teeth of the sliding bush 32. When the annular gear wheel 9 is connected rotationally fast to the web or planetary gear support 10 of the planetary gear wheel assembly 3 by the claw teeth of the sliding bush 32, the off-road gear of the auxiliary transmission 31 is deactivated.

Actuation of the controllable clutch 2 takes place via a transfer device 13 provided between the electric motor 8 and the clutch 2, whose mode of action corresponds approximately to that of the spherical-thread drive 11 in combination with the rocker arm 12, namely to transform a rotary movement of the electric motor 8 into a translational actuation movement so that the clutch 2 can be actuated by the electric motor.

At the end of the auxiliary transmission 31 facing away from the planetary gear wheel assembly 3 a hydraulic pump 14 is arranged directly on the drive input shaft 4, which is provided in order to supply the auxiliary transmission 31 with oil and which is driven at the speed of the drive input shaft 4. The arrangement of this hydraulic pump 14 ensures that even when the off-road gear is engaged the delivery performance of the hydraulic pump 14 remains constant, since the drive input speed to the hydraulic pump 14 remains constant notwithstanding the change in transmission ratio when the off-road gear is engaged.

Furthermore, the hydraulic pump 14 is arranged on the drive input shaft 4 side before a first transmission bearing 15, so that the distance between the said first transmission bearing 15 and a second transmission bearing 16 is smaller than if the pump were arranged between the two transmission bearings 15, 16. This minimizes the bend loading of the drive input shaft 4 and that of the first drive output shaft 5, so that in relation to bend loading the shafts 4 and 5 can be made smaller. In this way a weight reduction is simply achieved, as well as a reduction of the production cost of the auxiliary transmission 31.

The arrangement of the planetary gear wheel assembly 3 on the first drive output shaft 5 on the output side, i.e., at the end of the auxiliary transmission 31 facing away from the coupling zone 18, offers the possibility that the present auxiliary transmission according to the invention can also be made without the planetary gear wheel assembly 3 or reduction gear stage with little constructional effort. Thus, the auxiliary transmission according to the invention has a modular structure which can be simply and inexpensively adapted to various application cases. Accordingly, depending on the application in question additional functions required in the auxiliary transmission can be integrated in the auxiliary transmission with little effort, or if necessary functions not needed can be omitted with very little effort.

Figure 2:
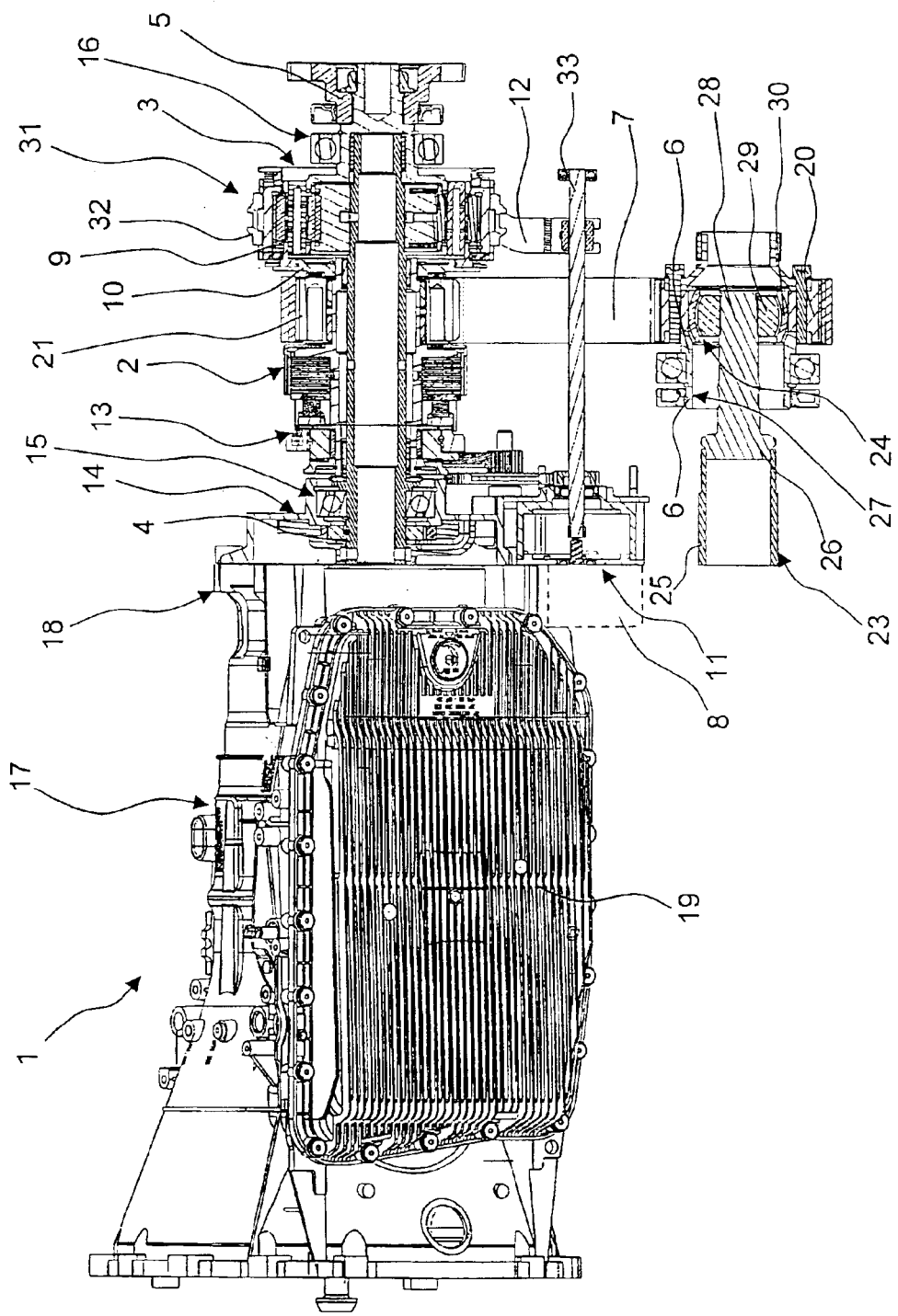
FIG. 2 is a second example embodiment of a range-change transmission with a main transmission unit and an auxiliary transmission according to the invention.

FIG. 2 shows the range-change transmission 1 illustrated in FIG. 1 with the auxiliary transmission 31 and the main transmission unit 17 connected therewith, the difference between the range-change transmissions according to FIGS. 1 and 2 existing only in the area of the second drive output shaft 6. For that reason and for the sake of clarity, components with the same structure and function are indexed in the same way in the description.

From the representations of FIGS. 1 and 2 it can be seen that the electric motor 8 is arranged in the coupling zone 18 between the auxiliary transmission 31 and the main transmission unit 17, so that a centre of gravity of the auxiliary transmission 31 is displaced in the direction of the coupling zone 18. The displacement of the centre of gravity of the auxiliary transmission 31 has the result that the electric motor 8 or adjustment motor for the clutch 2 and the sliding bush 32 are considerably less affected by vibration loading, which as expected extends the life of the electric motor 8 and which also makes it unnecessary to have any additional fastening of the electric motor 8 to the transmission housing 19 of the main transmission unit 17.

The electric motor 8 is arranged in the coupling zone 18 between the auxiliary transmission 31 and the main transmission unit 17 in such manner that it projects beyond an area of the main transmission unit 17 facing towards the auxiliary transmission 31 and is positioned outside a housing 19 of the main transmission unit. This allows the housing 19 of the main transmission unit 17 to be designed independently of the electric motor 8 and simplifies the assembly of the range-change transmission 1 as a whole.

Obviously, as an alternative to this it is a matter for the judgement of a person with knowledge of the field to attach the electric motor by appropriate means either to the housing of the auxiliary transmission or to that of the main transmission unit or to both at the same time. In addition it can also be provided that a damper element is arranged between the electric motor and the housing of the auxiliary transmission and between the electric motor and the housing of the main transmission unit respectively, to ensure or achieve vibration decoupling between the auxiliary transmission, the main transmission unit and the electric motor and to avoid juddering impact between these structural groups during operation.

The second drive output shaft 6 has a first gear wheel 20 or drive output gear over which is led the chain 7 that connects the drive input shaft 4 and the second drive output shaft. In the area of the drive input shaft 4 the auxiliary transmission 31 has a second gear wheel 21, which can be connected rotationally fast with the drive input shaft 4 by means of the clutch 2 and over which the chain 7 is also led. This means that when the clutch 2 is closed, a torque transferred by the drive input shaft 4 into the auxiliary transmission 31 is transmitted to the second drive output shaft 6 via the clutch 2, the second gear wheel 21, the chain 7 and the first gear wheel or drive output gear 20 connected rotationally fast to the second drive output shaft 6.

In the embodiment shown in FIG. 1 the second drive output shaft 6 is formed with a drive output flange 22 to which a cardan shaft known as such and not shown here can be attached with several bolt connections. The cardan shaft serves to connect the auxiliary transmission 31 to one of the drive shafts of the vehicle, which in turn is connected to the drive wheels of the vehicle.

The cardan shaft consists of two universal joints and a tubular component arranged between the two universal joints. The universal joints are provided in order to compensate any offset between the rotation axis of the second drive output shaft 6 of the auxiliary transmission 31 and the rotation axis of the drive shaft connected to the drive wheels of the vehicle. By virtue of this design of the connection between the second drive output shaft 6 of the auxiliary transmission and a drive shaft of the vehicle, any variable offsets between the second drive output shaft 6 and the drive shaft of the drive wheels that occur during the vehicle's driving operation can be compensated. Furthermore, the use of the cardan shaft enables uniform transfer of a torque from the auxiliary transmission 31 to the drive wheels in active connection with the second drive output shaft 6.

The design of the second drive output shaft 6 with the drive output flange 22 shown in FIG. 1 is a structure known as such from current practice, in which a very large distance has to be provided between the auxiliary transmission 31 and the main transmission unit 17 in order to keep a deflection angle arising due to the offset between the second drive output shaft 6 and the drive shaft of the drive wheels of a vehicle below a certain upper limit. In this case the said upper limit is that value of the deflection angle of the cardan shaft above which the torque can no longer be transmitted via the cardan shaft.

To be able to reduce the distance between the auxiliary transmission 31 and the main transmission unit 17 in the coupling zone 18, in the embodiment of the auxiliary transmission 31 shown in FIG. 2 the universal joint 24 arranged on the end of the cardan shaft 23 facing towards the second drive output shaft 6 is integrated in the first gear wheel 20. This increases the distance between the two link points of the two universal joints of the cardan shaft 23, so that the deflection angle of the cardan shaft is reduced. This measure allows larger offsets to be accommodated between the auxiliary transmission 31 or its second drive output shaft 6 and the drive shaft of the drive wheels, than with the embodiment of the auxiliary transmission 31 shown in FIG. 1.

Conversely, integration of the universal joint 24 in the second gear wheel 21 of the auxiliary transmission 31 makes it possible to reduce the distance between the auxiliary transmission 31 and the main transmission unit 17 in the coupling zone 18 without increasing the deflection angle of the cardan shaft compared with the version of the auxiliary transmission 31 shown in FIG. 1. Advantageously, this reduction of the distance between the auxiliary transmission 31 and the main transmission unit 17 results in a displacement of the centre of gravity of the drive train towards the main transmission unit 17, whereby the rigidity and the characteristic bending frequency of the vehicle's drive train are increased as a whole.

Moreover, integration of the universal joint 24 in the second gear wheel 21 of the auxiliary transmission 31 leads to a reduction of the overall weight of the auxiliary transmission 31 and the cardan shaft 23, when the range-change transmission is made more compact. This is the case when the larger distance between the universal joints of a cardan shaft is used to reduce the distance between the auxiliary transmission 31 and the main transmission unit 17, because less material is then used.

The cardan shaft 23 in FIG. 2 consists in this case of a hollow cylindrical section 25 and a cylindrical pin 26 whose diameter is smaller than that of the said hollow cylindrical section 25, which is welded to a bearing shaft 28 of the universal joint 24 in an area 27.

The bearing shaft 28 is connected rotationally fast to a bearing element 29 shaped spherically on its outside, which is in turn arranged and able to tilt freely in a bearing shell 30. Between the bearing element 29 and the bearing shell 30 is provided a rotationally fast connection known as such and not shown here. By virtue of this rotationally fast connection the torque transferred by the chain 7 is transmitted from the first gear wheel 20 to the universal joint 24 and so to the cardan shaft 23.

Reference Numerals

1 Range-change transmission
2 Clutch
3 Planetary gear wheel assembly
4 Drive input shaft
5 First drive output shaft
6 Second drive output shaft
7 Chain
8 Electric motor
9 Annular gear wheel
10 Web
11 Spherical thread drive
12 Rocker arm
13 Transfer device
14 Hydraulic pump
15 First transmission bearing
16 Second transmission bearing
17 Main transmission unit
18 Coupling zone
19 Housing of the main transmission unit
20 First gear wheel
21 Second gear wheel
22 Drive output flange
23 Cardan shaft
24 Universal joint
25 Hollow cylindrical section
26 Cylindrical pin
27 Area
28 Bearing shaft
29 Bearing element
30 Bearing shell
31 Longitudinal auxiliary transmission, auxiliary transmission
32 Sliding bush
32 Shaft

What is claimed is:

1. A transfer transmission (31) with a controllable clutch (2), for optional distribution of a drive output torque to at least one drive output shaft (5, 6), a reduction gear stage (3) and a hydraulic pump (14);

wherein the hydraulic pump (14) is arranged on a transmission input shaft (4) and the reduction gear stage (3) is connected in series in such manner that a drive input power to the hydraulic pump (14) remains at least approximately the same when a range change takes place in the reduction gear stage (3); and the reduction gear stage (3) is located after the clutch (2) and a distributor unit is arranged on a first drive output shaft (5).

2. The transfer transmission according to claim 1, wherein an electric motor (8) is provided for actuating the clutch (2) and the reduction gear stage (3).

3. The transfer transmission according to claim 2, wherein the electric motor (8) is arranged in a coupling zone (18) between the transfer transmission (31) and a main transmission unit (17).

4. The transfer transmission according to claim 1, wherein the transmission input shaft (4) is at least partially mounted in a housing of the transfer transmission (31) and the hydraulic pump (14) is arranged outside bearings (15,16) which support the transmission input shaft (4).

5. The transfer transmission according to claim 4, wherein an electric motor (8) is provided for actuating the clutch (2) and the reduction gear stage (3).

6. The transfer transmission according to claim 5, wherein the electric motor (8) is arranged in a coupling zone (18) between the transfer transmission (31) and a main transmission unit (17).

7. A transfer transmission (31) with a controllable clutch (2), for optional distribution of a drive output torque to at least one drive output shaft (5, 6), a reduction gear stage (3) and a hydraulic pump (14);

wherein the hydraulic pump (14) is arranged on a transmission input shaft (4) and the reduction gear stage (3) is connected in series in such manner that a drive input power to the hydraulic pump (14) remains at least approximately the same when a range change takes place in the reduction gear stage (3); and an electric motor (8) is provided for actuating the clutch (2) and the reduction gear stage (3).

8. The transfer transmission according to claim 7, wherein the electric motor (8) is arranged in a coupling zone (18) of the transfer transmission (31) with a main transmission unit (17).

9. The transfer transmission according to claim 8, wherein the transmission Input shaft (4) is at least partially mounted in a housing of the transfer transmission (31) and the hydraulic pump (14) is arranged outside bearings (15, 16) which support the transmission input shaft (4).

10. The transfer transmission according to claim 7, wherein the transmission input shaft (4) is at least partially mounted in a housing of the transfer transmission (31) and the hydraulic pump (14) is arranged outside bearings (15, 16) which support the transmission input shaft (4).

\* \* \* \* \*